US012548675B2

(12) United States Patent
Walsh et al.

(10) Patent No.: US 12,548,675 B2
(45) Date of Patent: Feb. 10, 2026

(54) DIAGNOSIS AND TREATMENT RECOMMENDATION USING QUANTUM COMPUTING

(71) Applicant: Optum Services (Ireland) Limited, Dublin (IE)

(72) Inventors: Lisa E. Walsh, Dublin (IE); Vicente Rubén Del Pino Ruiz, Dublin (IE); Paul J. Godden, London (GB); Vikas Raj Paidimukkala, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 487 days.

(21) Appl. No.: 17/646,252

(22) Filed: Dec. 28, 2021

(65) Prior Publication Data

US 2023/0207124 A1 Jun. 29, 2023

(51) Int. Cl.
*G16H 50/20* (2018.01)
*G06N 10/40* (2022.01)

(52) U.S. Cl.
CPC ............. *G16H 50/20* (2018.01); *G06N 10/40* (2022.01)

(58) Field of Classification Search
CPC ........ G16H 50/20; G16H 50/50; G16H 20/90; G16H 40/67; G16H 20/10; G16H 40/63; G16H 10/60; G16H 50/70; G16H 20/40; G16H 10/40; G16H 30/40; G16H 40/20; G16H 10/00; G16H 20/17; G16H 30/20; G16H 50/30; G16H 50/80; G16H 70/20; G16H 70/40; G06Q 30/0631
See application file for complete search history.

(56) References Cited

U.S. PATENT DOCUMENTS

| 10,941,447 | B2 * | 3/2021 | Dudley, Jr. | ........... G01N 33/577 |
| 11,114,208 | B1 * | 9/2021 | Thomas | ............... A61B 5/0077 |
| 11,848,106 | B1 * | 12/2023 | Wood | ..................... G16H 50/20 |

(Continued)

FOREIGN PATENT DOCUMENTS

WO    WO-2015183601 A1 * 12/2015 ........... C12Q 1/6883

OTHER PUBLICATIONS

Pakela, J. M. (2021). Quantum inspired machine learning algorithms for adaptive radiotherapy (Order No. 28845200). Available from ProQuest Dissertations and Theses Professional. (2589950373). (Year: 2021).*

(Continued)

*Primary Examiner* — Maria C Santos-Diaz
(74) *Attorney, Agent, or Firm* — Shumaker & Sieffert, P.A.

(57) ABSTRACT

This disclosure describes techniques for providing diagnosis and treatment recommendations using quantum computing. For example, a quantum computing device encodes diagnosis-relevant information of a patient as one or more patient diagnosis qubits. The quantum computing device implements a first quantum search algorithm using the patient diagnosis qubits to determine a diagnosis likelihood for each condition of a plurality of conditions. The quantum computing device further encodes the diagnosis data and treatment-relevant information of the patient as one or more patient treatment qubits. The quantum computing device implements a second quantum search algorithm using the treatment-relevant information of the patient to determine one or more treatment recommendations for the patient.

15 Claims, 3 Drawing Sheets

(56) References Cited

U.S. PATENT DOCUMENTS

| | | | |
|---|---|---|---|
| 11,996,199 B2* | 5/2024 | Seguin | G16H 50/70 |
| 2005/0262179 A1* | 11/2005 | Tucci | B82Y 10/00 |
| | | | 708/446 |
| 2018/0011981 A1* | 1/2018 | El Naqa | G06N 5/04 |
| 2018/0330824 A1* | 11/2018 | Athey | G16B 40/30 |
| 2019/0197426 A1 | 6/2019 | Kawano et al. | |
| 2019/0237167 A1 | 8/2019 | Abraham | |
| 2020/0155079 A1* | 5/2020 | Kusu | G06T 7/0012 |
| 2021/0128255 A1* | 5/2021 | Mason | A63B 23/0476 |
| 2021/0134418 A1* | 5/2021 | Frieder | G06F 18/24 |
| 2021/0299387 A1* | 9/2021 | Higginbotham | G06N 20/00 |
| 2022/0301666 A1* | 9/2022 | Shluzas | G06N 3/04 |
| 2022/0335328 A1* | 10/2022 | Frosch | G16H 50/70 |
| 2022/0375611 A1* | 11/2022 | Gates | H04L 63/1441 |
| 2024/0143696 A1* | 5/2024 | Cemgil | G06N 3/04 |
| 2024/0358331 A1* | 10/2024 | Au | A61B 5/7257 |
| 2025/0200108 A1* | 6/2025 | McCarson | G08G 1/0133 |

OTHER PUBLICATIONS

Ahmed Z, Mohamed K, Zeeshan S, Dong X. Artificial intelligence with multi-functional machine learning platform development for better healthcare and precision medicine. Database (Oxford). Jan. 1, 2020;2020:baaa010. doi: 10.1093/database/baaa010. PMID: 32185396; PMCID: PMC7078068. (Year: 2020).*

Bengtson, "Quantum Technology and the Medical Librarian", Journal of Hospital Librarianship, vol. 15, No. 3, 2015, 12 pp., (Applicant points out, in accordance with MPEP 609.04(a), that the year of publication, 2015, is sufficiently earlier than the effective U.S. filing date, so that the particular month of publication is not in issue.).

cms.gov, "Chronic Conditions", Dec. 1, 2021, 3 pp., retrieved from https://www.cms.gov/Research-Statistics-Data-and-Systems/Statistics-Trends-and-Reports/Chronic-Conditions/CC_Main, retrieved on May 13, 2022.

Conley et al., "A Schematic Overview of Securing Precision Medicine Data with a DNA Database System", Turkish Journal of Science and Technology, vol. 12, No. 1, Mar. 2017, pp. 25-32.

Fernandes et al., "Clinical Decision Support Systems for Triage in the Emergency Department using Intelligent Systems: a Review", Artificial Intelligence in Medicine, vol. 102, Jan. 2020, p. 22.

Hartman-Caballero, "Quantum Computing and Drug Discovery", The College of William and Mary, May 10, 2021, 8 pp., retrieved from https://cklixx.people.wm.edu/teaching/math400/Kylee-2.pdf.

Kumar et al., "Efficient Automated Disease Diagnosis Using Machine Learning Models", Journal of Healthcare Engineering, vol. 2021, Hindawi, London, UK, May 6, 2021, 13 pp., https://doi.org/10.1155/2021/9983652.

Pakela et al., "Quantum-inspired algorithm for radiotherapy planning optimization", Medical Physics, vol. 47, No. 1, Jan. 1, 2021, pp. 5-18, doi:10.1002/mp.13840.

Pomarico et al., "A Proposal of Quantum-Inspired Machine Learning for Medical Purposes: An Application Case", Mathematics, vol. 9, No. 410, Feb. 19, 2021, 15 pp., https://doi.org/10.3390/math9040410.

Solenov et al., "The Potential of Quantum Computing and Machine Learning to Advance Clinical Research and Change the Practice of Medicine", Missouri Medicine, vol. 115, No. 5, Sep. 2018, pp. 463-467.

Weigold et al., "Data Encoding Patterns for Quantum Computing", PLoP'20: Proceedings of the 27th Conference on Pattern Languages of Programs Article No. 2, Oct. 2020, 10 pp.

* cited by examiner

DIAGNOSIS AND TREATMENT RECOMMENDATION USING QUANTUM COMPUTING

TECHNICAL FIELD

The disclosure relates to quantum computing.

BACKGROUND

In contrast to classical computing, which is based on classical physics, quantum computing leverages quantum mechanics to process information. Specifically, quantum computers may perform computational tasks by executing quantum algorithms (e.g., quantum logic operations applied to quantum bits ("qubits")). A quantum algorithm may represent a quantum circuit that includes one or more quantum gates configured to act on qubits. By applying quantum gates in succession, a quantum computer may perform a transformation to a set of qubits in some initial state.

Due to the laws of quantum mechanics, qubits are not binary in nature. For example, a qubit may exist as 0, 1, or simultaneously as both 0 and 1, with a numerical coefficient representing a probability for each state. This superposition of states may enable computational leaps over classical computing techniques. A variety of physical systems have been developed for quantum computing applications. Examples include superconducting circuits, trapped ions, spin systems and others.

SUMMARY

In general, this disclosure is directed to techniques for providing diagnosis of medical conditions and treatment recommendations using quantum computing. For example, a treatment recommendation system using quantum computing receives patient information of potential relevance to determine a diagnosis of the patient (referred to herein as "diagnosis-relevant information"), such as biological characteristics, current symptoms, medical history, etc., and encodes the information as one or more qubits (referred to herein as "patient diagnosis qubits"). The treatment recommendation system applies a quantum search algorithm that uses the patient diagnosis qubits to search within a diagnosis risk database—that includes a diagnosis risk (e.g., diagnosis probability) for each condition based on all combinations of the diagnosis-relevant information of the patient—to determine the diagnosis likelihood for each condition of a plurality of conditions. In response to determining the diagnosis likelihood for each condition for the patient, the treatment recommendation system then encodes the diagnosis likelihood for each condition and treatment information of the patient ("treatment-relevant information"), such as medication adherence information and/or medication efficacy information, as one or more qubits (referred to herein as "patient treatment qubits"). The treatment recommendation system applies a quantum search algorithm that uses the patient treatment qubits to search within a medication risk/efficacy database to determine one or more treatment recommendations for the patient, such as one or more recommended medications for the patient. The medication risk/efficacy database may include a recommendation score for each medication computed, e.g., based on the non-adherence drug risk, drug to condition efficacy, and drug to condition risk.

The techniques may provide one or more technical advantages. For example, due to the large datasets within the diagnosis risk database and medication risk/efficacy database resulting from all combinations of patient information, existing treatment recommendation systems that use classical computing are unable to search within the large datasets to determine the likely condition and treatment recommendation within a short duration of time, e.g., during the duration of a typical doctor's visit. Instead, existing treatment recommendation systems may use reduced datasets of patient information that do not take into consideration, for example, the full historical and current medical information of a patient and/or the risk of misdiagnosis and mistreatment based on patient specific information, which may increase the risk of misdiagnosis and/or mistreatment. By using quantum computing to determine the likely diagnosis and one or more treatment recommendations, the treatment recommendation system is able to provide one or more treatment recommendations in real-time or near real-time while taking into account the patient's full historical and current medical information. Moreover, by determining one or more treatment recommendations based on a diagnosis likelihood of a condition and the risk of misdiagnosis and treatment based on a patient's medical history, the treatment recommendation system may consider all combinations of information of a patient's medical history, including much more granular information (e.g., specific day of last medical procedure or medication prescription), which may reduce the risk of misdiagnosis and/or mistreatment.

In one example, a quantum computing device comprises: a first quantum encoder configured to encode diagnosis-relevant information of a patient as one or more patient diagnosis qubits, wherein the diagnosis-relevant information comprises information of potential relevance to determining a diagnosis of the patient; a first quantum circuit configured to implement a first quantum search algorithm that uses the one or more patient diagnosis qubits to search within a first database for one or more entries that correspond to the diagnosis-relevant information of the patient, wherein the one or more entries that correspond to the diagnosis-relevant information of the patient comprises diagnosis data for the patient, wherein the diagnosis data for the patient comprises a likelihood for each condition of a plurality of conditions; a second quantum encoder configured to encode the one or more entries that correspond to the diagnosis data for the patient and treatment-relevant information of the patient as one or more patient treatment qubits, wherein the treatment-relevant information comprises information of potential relevance to determining a treatment of the patient; and a second quantum circuit configured to implement a second quantum search algorithm that uses the one or more patient treatment qubits to search within a second database for one or more entries that correspond to the diagnosis data for the patient and the treatment-relevant information of the patient, wherein the one or more entries that correspond to the diagnosis data for the patient and the treatment-relevant information of the patient indicates one or more treatment recommendations for the patient.

In another example, a method comprises: encoding, by a quantum computing device, diagnosis-relevant information of a patient as one or more patient diagnosis qubits, wherein the diagnosis-relevant information comprises information of potential relevance to determining a diagnosis of the patient; implementing, by the quantum computing device, a first quantum search algorithm that uses the one or more patient diagnosis qubits to search within a first database for one or more entries that correspond to the diagnosis-relevant information of the patient, wherein the one or more entries that correspond to the diagnosis-relevant information of the patient comprises diagnosis data for the patient, wherein the diagnosis data for the patient comprises a likelihood for each condition of a plurality of conditions; encoding, by the quantum computing device, the one or more entries that correspond to the diagnosis data for the patient and treatment-relevant information of the patient as one or more patient treatment qubits, wherein the treatment-relevant information comprises information of potential relevance to determining a treatment of the patient; and implementing, by the quantum computing device, a second quantum search algorithm that uses the one or more patient treatment qubits to search within a second database for one or more entries that correspond to the diagnosis data for the patient and the treatment-relevant information for the patient, wherein the one or more entries that correspond to the diagnosis data for the patient and the treatment-relevant information of the patient indicates one or more treatment recommendations for the patient.

In another example, a non-transitory computer-readable storage medium encoded with instructions that, when executed by one or more processors, cause the one or more processors to: encode diagnosis-relevant information of a patient as one or more patient diagnosis qubits, wherein the diagnosis-relevant information comprises information of potential relevance to determining a diagnosis of the patient; implement a first quantum search algorithm that uses the one or more patient diagnosis qubits to search within a first database for one or more entries that correspond to the diagnosis-relevant information of the patient, wherein the one or more entries that correspond to the diagnosis-relevant information of the patient comprises diagnosis data for the patient, wherein the diagnosis data for the patient comprises a likelihood for each condition of a plurality of conditions; encode the one or more entries that correspond to the diagnosis data for the patient and treatment-relevant information of the patient as one or more patient treatment qubits, wherein the treatment-relevant information comprises information of potential relevance to determining a treatment of the patient; implement a second quantum search algorithm that uses the one or more patient treatment qubits to search within a second database for one or more entries that correspond to the diagnosis data for the patient and the treatment-relevant information of the patient, wherein the one or more entries that correspond to the diagnosis data for the patient and the treatment-relevant information of the patient indicates one or more treatment recommendations for the patient.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Various industries, such as healthcare, may use large datasets of information to provide diagnosis and treatment recommendations for patients. For example, the diagnosis of a particular medical condition and treatment recommendation for a patient depends on current and historical information of the patient (e.g., biological characteristics, current symptoms, medical history, medication history, etc.). However, consideration of all combinations of patient information, including diagnosis risk and medication risk information, may be a computationally challenging task, particularly given the limited duration of a doctor's visit to exhaustively review the entirety of all combinations of patient information, while conducting other typical health checks (e.g., taking a blood pressure reading, etc.). To quickly provide a diagnosis and treatment recommendation, some existing treatment recommendation systems use reduced datasets of patient information that do not take into consideration, for example, a likelihood of a diagnosis and/or the risk of misdiagnosis and mistreatment based on patient specific information. Other existing treatment recommendation systems may evaluate large datasets of patient information, but are slow and do not weigh the medication risks based on the likelihood of diagnosis. Without consideration of medication risks based on the likelihood of diagnosis, the use of these existing treatment recommendation systems may result in misdiagnosis and/or incorrect treatment that may be harmful or even fatal.

This disclosure describes a treatment recommendation system using quantum computing to improve the performance of diagnosis and treatment recommendation to facilitate a faster and more comprehensive evaluation of patient specific information while reducing the risk of misdiagnosis and treatment.

Figure 1:
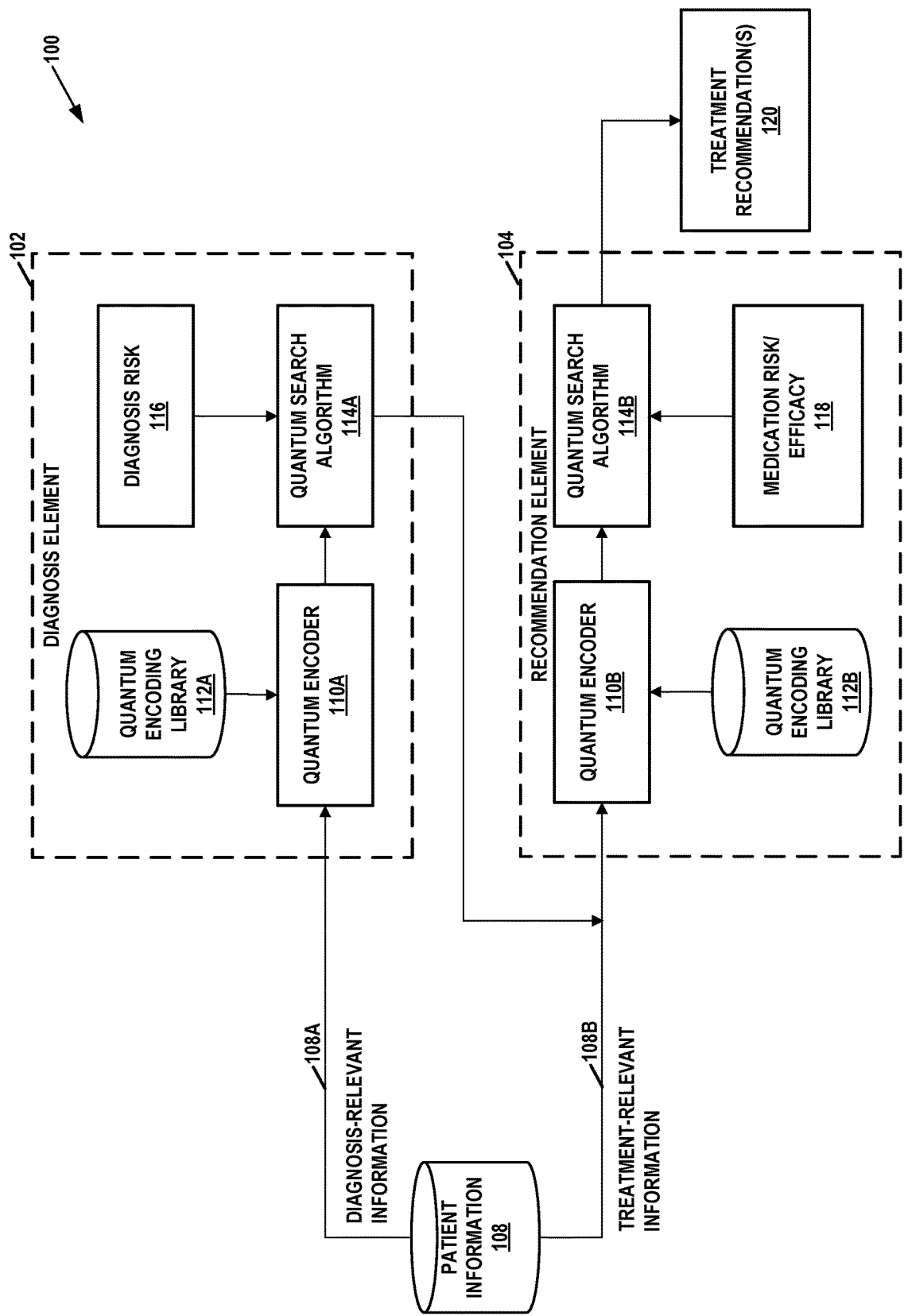
FIG. 1 is a conceptual diagram of an example treatment recommendation system using quantum computing.

FIG. 1 is a conceptual diagram illustrating a basic architecture of a treatment recommendation system 100 using quantum computing. In some examples, treatment recommendation system 100 may be a hybrid quantum computing system, meaning that treatment recommendation system 100 includes classical computing components and quantum computing components.

In the example of FIG. 1, treatment recommendation system 100 may receive patient information 108. Patient information 108 may include current and historical patient information. For example, current patient information may include patient characteristics, such as age, gender, ethnicity, weight, etc. of a patient. Current patient information may additionally include the current symptoms of the patient. Historical patient information may include a medical history of the patient, such as a patient's prior medical diagnoses, prior medical claims, prior medications, or other prior medical information associated with the patient. In some examples, the historical patient information may include much more granular information such as the number of days since a prior surgery was performed, the number of days since a prior medication was used, number of days since the patient's last doctor's visit, the number of minutes a patient experienced a particular symptom, the dosage amount of medication prescribed in the past, family medical history, or other specific information associated with the patient. The characteristics of the patient, current symptoms of the patient, and medical history of the patient may be used to determine the diagnosis of the patient and is collectively referred to herein as "diagnosis-relevant information" (illustrated in FIG. 1 as diagnosis-relevant information 108A). Patient information 108 may also include medication information, such as a risk associated with using a particular medication in treating a particular condition, efficacy of the particular medication in treating the particular condition, risk of using the medication incorrectly, etc., and may be referred to herein as "treatment-relevant information" (illustrated in FIG. 1 as treatment-relevant information 108B).

Treatment recommendation system 100 may use quantum computing to provide, in real-time or near real-time, one or more treatment recommendations (e.g., recommended medications) for a patient based on the patient information. In the example of FIG. 1, treatment recommendation system 100 may include a diagnosis element 102 and a recommendation element 104. In this example, diagnosis element 102 includes a quantum encoder 110A to encode the diagnosis-relevant information 108A as one or more qubits (referred to herein as "patient diagnosis qubits"). In some examples, quantum encoder 110A may implement amplitude encoding in which diagnosis-relevant information 108A is encoded in the amplitude of qubits. In these examples, treatment recommendation system 100 may use Amplitude Amplification to process information encoded in the amplitude of qubits. Treatment recommendation system 100 may use other encoding techniques, such as angle encoding, Quantum Associative Memory (QuAM) encoding, Qsample encoding, divide-and-conquer encoding, Quantum Random Access Memory (QRAM) encoding, etc. In some examples, a user or administrator of treatment recommendation system 100 may select a quantum encoding technique from a library of quantum encoding techniques to encode data into qubits (illustrated in FIG. 1 as "quantum encoding library 112A").

In this example, diagnosis element 102 determines a likelihood of a patient having each condition of a plurality of conditions, such as chronic conditions as described in Centers for Medicare and Medicaid Services, available at https://www.cms.gov/Research-Statistics-Data-and-Systems/Statistics-Trends-and-Reports/Chronic-Conditions/CCMain and/or conditions as identified by Hierarchical Condition Categories. For example, diagnosis element 102 of treatment recommendation system 100 may include a database, e.g., diagnosis risks 116, that includes a risk (e.g., probability) of diagnosis for each condition based on all combinations of diagnosis-relevant information 108A. For example, diagnosis-relevant information 108A may include a patient with a prior emergency room visit 63 days ago and a prescription for insulin 19 days ago. Diagnosis element 102 may compute a diagnosis risk probability for Diabetes (and other conditions) based on the combination of the patient's prior emergency room visit and prior prescription of insulin. Diagnosis-relevant information 108A may include any number of patient specific information with much more granular information and the computation of diagnosis risk probability for each condition based on all combinations of patient specific information may result in a large dataset of diagnosis risks. In some examples, the computation of diagnosis risk probability for each condition may further be based on information from other patients.

In some examples, diagnosis element 102 may use a data model to compute a diagnosis risk probability for each condition based on diagnosis-relevant information 108A. For example, a data model may use diagnosis-relevant information (e.g., medical claims data) as input and output a diagnosis risk of a particular condition associated with the diagnosis-relevant information. In some examples, diagnosis element 102 may implement machine learning models to compute a diagnosis risk of each condition, such as XGBoost algorithm or other diagnosis models such as the diagnosis models as described in Kumar, et al., "Efficient Automated Disease Diagnosis Using Machine Learning Models," May 6, 2021, available at https://www.hindawi.com/journals/jhe/2021/9983652/, and Krishnamurthy, et al., "Machine Learning Prediction Models for Chronic Kidney Disease Using National Health Insurance Claim Data in Taiwan, May 7, 2021, available at https://www.mdpi.com/2227-9032/9/5/546.

The diagnosis risks for each condition are stored in diagnosis risk 116. Diagnosis element 102 may encode (e.g., using quantum encoder 110A) each entry of diagnosis risks 116 as a qubit. Diagnosis element 102 may apply quantum search algorithm 114A to the patient diagnosis qubits and the qubits encoded with the entries of diagnosis risks 116 to determine a likelihood of diagnosis for each condition associated with the patient. For example, diagnosis element 102 may apply quantum search algorithm 114A to the patient diagnosis qubits and the qubits encoded with the entries of diagnosis risks 116 to determine whether the state of one or more qubits encoded with the entries within diagnosis risks 116 match (or closely match) the state of patient diagnosis qubits encoded with diagnosis-relevant information 108A. The one or more entries within diagnosis risks 116 that correspond to the diagnosis-relevant information 108A may indicate a condition for the patient and a diagnosis likelihood of the condition, and is referred to herein as "diagnosis data." Quantum search algorithm 114A may include Grover's algorithm, Shor's algorithm, or other quantum search algorithms to search among qubits.

In response to determining the diagnosis likelihood of each condition associated with the patient, diagnosis element 102 may send the diagnosis data to recommendation element 104, which in turn may generate one or more treatment recommendations 120, such as one or more recommended medications for the diagnosis. As one example, quantum encoder 110B of recommendation element 104 may encode the diagnosis data determined by diagnosis element 102 and the treatment-relevant information 108B as one or more qubits (referred to herein as "patient treatment qubits"). In some examples, quantum encoder 110B may apply a quantum encoding technique from a library of quantum encoding techniques to encode data into qubits (illustrated in FIG. 1 as "quantum encoding library 112B"). In some examples, quantum encoder 110B may apply the same quantum encoding technique as quantum encoder 110A. In other examples, quantum encoder 110B may apply a different quantum encoding technique than quantum encoder 110A.

Diagnosis element 102 of treatment recommendation system 100 may also generate a recommendation score for each medication based on information of a particular drug, such as health risk associated with using the particular drug for a specific condition, efficacy of the particular drug in treating the specific condition, health risk associated with using the particular drug incorrectly, likelihood of the patient having the specific condition, likelihood of the patient using the particular drug incorrectly (e.g., based on history of medication non-adherence of misuse). As one example, the recommendation score is computed based on a risk and/or efficacy of a particular drug ("RiskEfficacy$_{dr}$") in treating a particular condition and a risk of drug non-adherence ("RiskMisuse$_{dr}$") in treating the particular condition as shown below:

RecommenderScore$_{dr}$=RiskEfficacy$_{dr}$−RiskMisuse$_{dr}$

An example of the computation of the risk and/or efficacy of a particular drug in treating a particular condition is shown below:

$$RiskEfficacy_{dr} = \sum_{diag}((\omega_r * (1 - R_{diag,dr})) + (\omega_e * E_{diag,dr})) * L_{diag}$$

where $\omega_r$ is the weight given to the risk of a particular drug for a specific condition, $\omega_e$ is the weight given to the efficacy of the particular drug for the specific condition, $R_{diag,dr}$ is the health risk associated with using the particular drug for the specific condition, $E_{diag,dr}$ is the efficacy of the particular drug in treating the specific condition, and $L_{diag}$ is the likelihood of the patient having the specific condition.

An example of the computation of the risk of drug non-adherence of the particular drug in treating the particular condition is shown below:

$$RiskMisuse_{dr} = \omega_m * R_m * L_m$$

where $\omega_m$ is the weight given to the risk of the particular drug if the patient were to use the drug incorrectly, $R_m$ is the health risk associated with using the particular drug incorrectly, and $L_m$ is the likelihood of the patient using the particular drug incorrectly (e.g., based on the history of medication non-adherence or misuse).

The computation of the recommendation score described above is one example, and may include additional metrics, such as a patient's pharmacogenomic data (e.g., presence of certain receptors enabling more efficient drug binding) to determine the likely efficacy of a drug in light of the patient's pharmacogenomic profile. The weights used to compute the recommendation score may depend on the context of the process application. For example, if the application was applied to an emergency department context, current symptoms and adverse reactions to medication may be weighted higher than in an outpatient context, where historical diagnosis may be weighted higher.

The recommendation score for each treatment is stored in a database, e.g., medication/risks efficacy 118 (otherwise referred to herein as a "treatments database"). Recommendation element 104 may encode (e.g., using quantum encoder 110B) each entry in medication/risks efficacy 118 as a qubit. Recommendation element 104 may apply quantum search algorithm 114B (e.g., Grover's algorithm) to the patient treatment qubits and the qubits encoded with the entries of medication/risks efficacy 118 to determine one or more treatment recommendations for the likely diagnosis of the patient. For example, recommendation element 104 may apply quantum search algorithm 114B to the patient treatment qubits and the qubits encoded with the entries of medication/risks efficacy 118 to determine whether the state of one or more qubits encoded with the entries within medication/risks 118 match (or closely match) the state of patient treatment qubits. The one or more entries within medication/efficacy risks 118 that correspond to the treatment-relevant information 108B may indicate the one or more treatment recommendations for the patient, such as one or more recommended medications for the diagnosis.

In response to performing the quantum search, recommendation element 104 of treatment recommendation system 100 may provide the one or more treatment recommendations for the likely diagnosis resulting from the quantum search to a user (e.g., doctor or patient). For example, recommendation element 104 may output, e.g., to a classical computing device for display on a display of a computing device, the one or more treatment recommendations with their recommendation scores. In some examples, a user may specify a particular number of treatment recommendations to output, such as ten medications with the highest recommendation score to treat the likely diagnosis.

In some examples, treatment recommendation system 100 includes a feedback loop to inform treatment recommendation system 100 on the data model used to predict the diagnosis risk for a condition. For example, if diagnosis element 102 initially determines a low risk for diabetes using an initial data model, but a later review of the patient's medical history indicates that the diagnosis should be diabetes, treatment recommendation system 100 may generate an indication that the initial data model is inaccurate and/or cause treatment recommendation system 100 to select a different data model.

Figure 2:
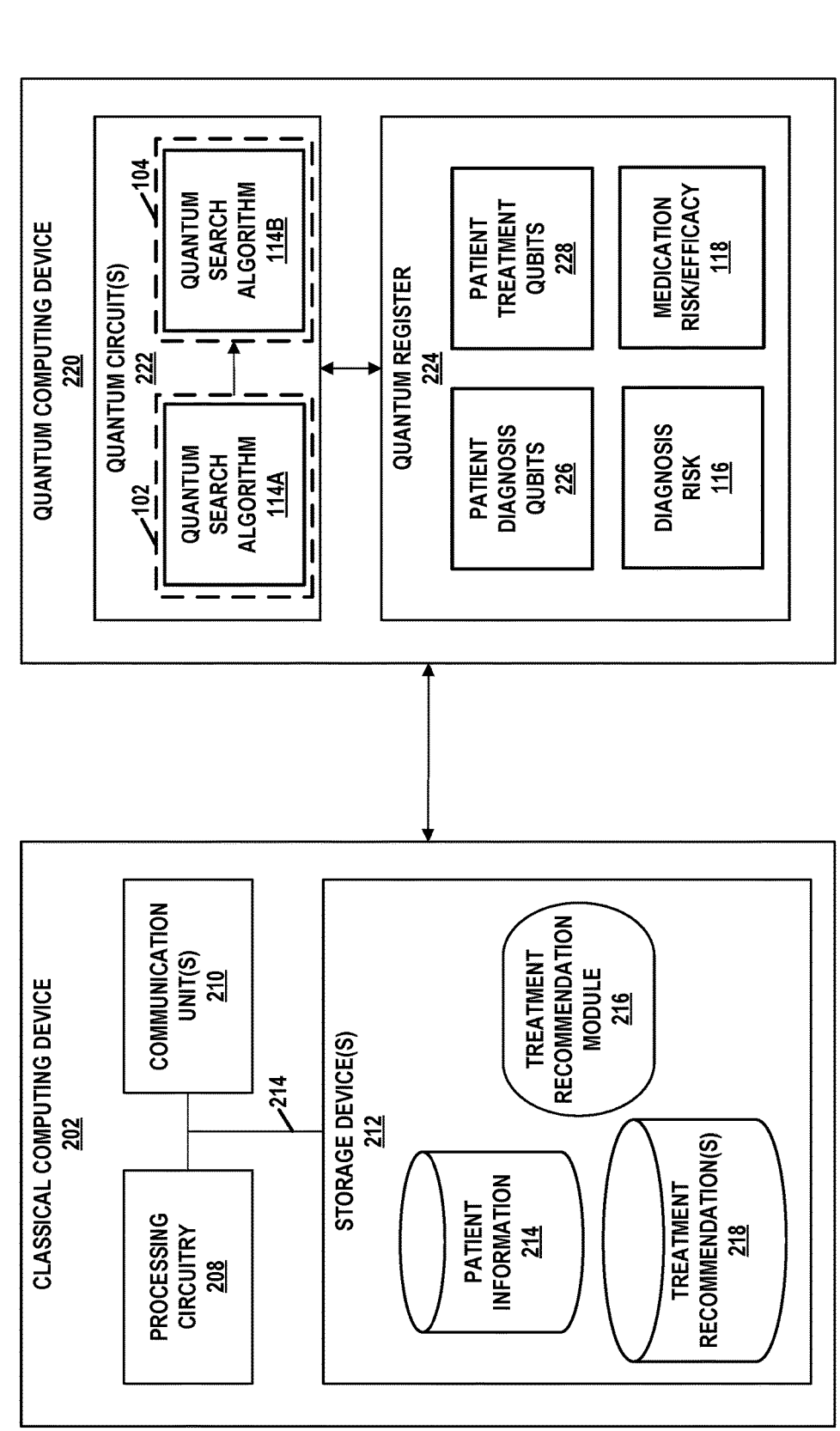
FIG. 2 is a conceptual diagram of an example quantum computing device.

FIG. 2 is a block diagram illustrating an example of a treatment recommendation system using quantum computing in greater detail. For ease of illustration, the treatment recommendation system 100 of FIG. 2 is described with respect to the treatment recommendation system 100 of FIG. 1.

In the example of FIG. 2, treatment recommendation system 100 includes a classical computing device 202 and a quantum computing device 220. Although FIG. 2 is described as a hybrid quantum computing system, the techniques may, in other examples, be implemented exclusively in a quantum computing device. Types of classical computing devices may include server devices, personal computers, handheld computers, data storage devices, or the like. As shown in the example of FIG. 2, classical computing device 202 includes one or more processing circuit(s) 208, one or more communication unit(s) 210, one or more storage device(s) 212, and one or more communication channels 214. Classical computing device 202 may include other components not shown in FIG. 2, such input devices, output devices, display screens, a power source, and so on. Communication channel(s) 214 may interconnect each of components 208, 210, and 212 for inter-component communications (physically, communicatively, and/or operatively). In some examples, communication channel(s) 214 may include a system bus, a network connection, an inter-process communication data structure, or any other method for communication data. Storage device(s) 212 may store information required for use during operation of computing device 202.

Processing circuitry 208 comprise circuitry configured to perform processing functions. For instance, one or more processing circuit(s) 208 may be a microprocessor, application-specific integrated circuit (ASIC), field-programmable gate array (FPGA), or another type of processing circuitry. In some examples, processing circuit(s) 208 of computing device 202 may read and execute instructions stored in storage device(s) 212.

Communication unit(s) 210 may enable computing device 202 to send data to and receive data from one or more other computing devices (e.g., via a communication network, such as a local area network or the Internet). For instance, communication unit(s) 210 may be configured to receive and send patient information (e.g., patient information 108 of FIG. 1). In some examples, communication unit(s) 210 may include wireless transmitters and receivers that enable computing device 202 to communicate wirelessly with the other computing devices. Examples of communication unit(s) 210 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. In some examples, communication unit(s) 210 may enable computing device 202 to communicate information, e.g., via a quantum channel, to a quantum interface of quantum computing device 220.

Storage device(s) 212 may be implemented using one or more types of devices for storing data. For example, one or more of storage device(s) 212 may be implemented using hard disk drives, solid state drives, random access memory (RAM), or other types of non-transitory computer-readable media. Storage device(s) 212 may store computer-executable instructions, such as programs or scripts. Processing circuit(s) 208 may read instructions from storage device(s) 212 and may execute instructions stored by storage device(s) 212. Execution of the instructions by processing circuit(s) 208 may configure or cause computing device 202 to provide at least some of the functionality described in this disclosure to computing device 202.

In some examples, storage device(s) 212 may include computer executable instructions for the treatment recommendation system 100, as described in this disclosure. For example, storage device(s) 212 may include instructions to configure or cause computing device 202 to receive patient information (e.g., patient information 108 of FIG. 1), e.g., via a graphical user interface (not shown) of computing device 202 or from another computing device via communication unit(s) 210. The patient information may be stored in storage device(s) 212, illustrated as patient information 214. The instructions may further configure or cause computing device 202 to send patient information to quantum computing device 220, receive one or more treatment recommendations from quantum computing device 220, and output, e.g., for display on a display of computing device 202, the one or more treatment recommendations.

Treatment recommendation system 100 includes a quantum computing device 220 configured to provide diagnosis of medical conditions and generate one or more treatment recommendations. The type of quantum computing device 220 may include a quantum circuit model, as shown in FIG. 2, but may alternatively include a quantum Turing machine, adiabatic quantum computer, one-way quantum computer, and various quantum cellular automata.

Quantum computing device 220 includes one or more quantum circuits 222 that each includes one or more quantum gates configured to act on the qubits. Quantum circuit(s) 222 may each be configured to implement a quantum algorithm (e.g., quantum search algorithms 114A or 114B of FIG. 1). Quantum gates may include an identity gate, Pauli gates, controlled gates, phase shift gates, rotation operator gates, Hadamard gate, swap gate, Toffoli gate, Fredkin gate, Ishing coupling gates, Imaginary swap gate, Deutsch gate, or other quantum gates. Quantum circuit(s) 222 may also decode the quantum solution (e.g., one or more treatment recommendations) into classical data, which quantum computing device 220 sends to computing device 202.

Quantum computing device 220 includes a quantum register 224 that groups qubits. For example, quantum register 224 may include a register to store patient diagnosis qubits encoded with diagnosis-relevant information from patient information 108 (illustrated as "patient diagnosis qubits 226"). Quantum register 224 may also include a register to store patient treatment qubits encoded with the diagnosis data determined by diagnosis element 102 and treatment-relevant information 108B (illustrated as "patient treatment qubits 228"). Quantum register 224 may also include a database of qubits encoded with the diagnosis risk for each condition (e.g., diagnosis risk 116 of FIG. 1) and a database of qubits encoded with one or more treatment recommendations having recommendation scores (e.g., medication/risk efficacy 118 of FIG. 1).

In the illustrated example of FIG. 2, quantum computing device 220 may receive patient information 108 from computing device 202 (e.g., in the form of classical data) and encode the diagnosis-relevant information of the patient information into qubits (e.g., patient diagnosis qubits). The patient diagnosis qubits and qubits encoded with the information in diagnosis risks 116 may pass through one or more quantum gates in quantum circuit 222 configured in accordance with quantum search algorithm 114A (e.g., Grover's algorithm) of diagnosis element 102. The output of the quantum search algorithm 114A of diagnosis element 102 are one or more of the qubits encoded with information in diagnosis risk 116 that have a state that matches (or closely match) the state of the patient diagnosis qubits, which represent the diagnosis data for the patient (e.g., diagnosis likelihood for each condition associated with the patient).

The diagnosis data for the patient (e.g., diagnosis likelihood for each condition associated with the patient) and the treatment-relevant information is encoded as one or more patient treatment qubits. The patient treatment qubits and qubits encoded with one or more treatment recommendations may pass through one or more quantum gates in quantum circuit 222 configured in accordance with quantum search algorithm 114B of recommendation element 104. The output of the quantum search algorithm 114B of recommendation element 104 are one or more of the qubits encoded with information in medication risk/efficacy 118 that have a state that matches (or closely match) the state of the patient treatment qubits, which represent the one or more treatment recommendations for the patient.

Quantum circuit 222 may decode the one or more treatment recommendations into classical data and quantum computing device 220 may send the one or more treatment recommendations to a classical computing device, e.g., classical computing device 200, which may store the one or more treatment recommendations in storage device(s) 212 (illustrated as "treatment recommendation(s) 218") and/or output, e.g., for display on a display of computing device 202, the one or more treatment recommendations for the patient.

Figure 3:
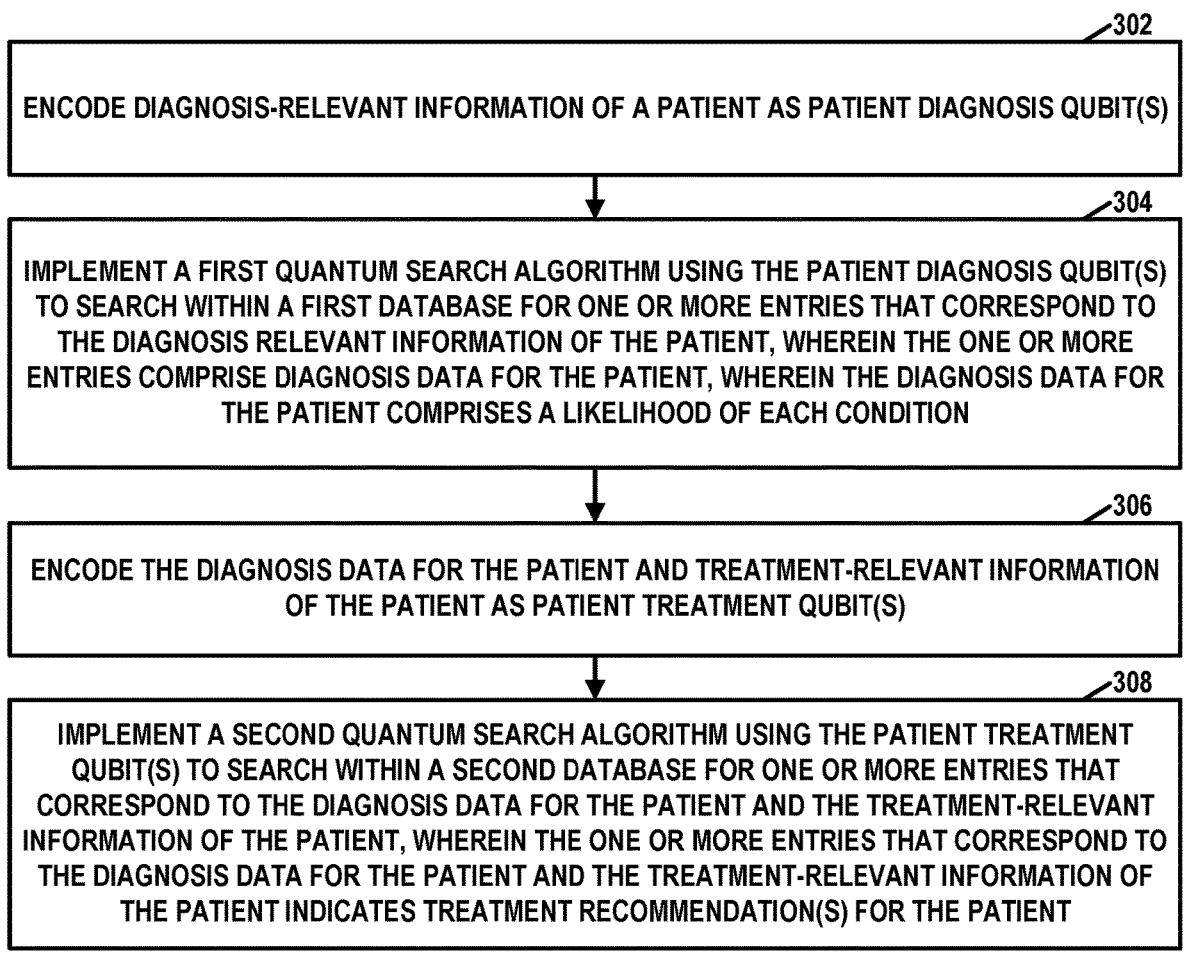
FIG. 3 is a flow diagram of an example operation of the treatment recommendation system using quantum computing.

FIG. 3 is a flow diagram of an example operation of the treatment recommendation system using quantum computing. For ease of illustration, FIG. 3 is described with respect to the treatment recommendation system 100 of FIGS. 1 and 2.

The treatment recommendation system 100 receives patient information including diagnosis-relevant information and treatment-relevant information. For example, the computing device 202 of treatment recommendation system 100 may receive patient information 108 including current patient information, such as patient characteristics (e.g., age, gender, ethnicity, etc.) and symptoms of the patient, and historical patient information such as the medical history of the patient and medical adherence information. The computing device 202 of treatment recommendation system 100 may send the patient information to quantum computing device 220.

Treatment recommendation system 100 encodes the diagnosis-relevant information of patient information as a patient diagnosis qubit (302). For example, the quantum computing device 220 of treatment recommendation system 100 encodes diagnosis-relevant information 108A of a patient as one or more patient diagnosis qubits.

Treatment recommendation system 100 implements a first quantum search algorithm using the one or more patient diagnosis qubits to search within a first database (e.g., diagnosis risks 116) for one or more entries corresponding to the diagnosis-relevant information 108A of the patient (304). For example, quantum circuit 222 of quantum computing device 220 may apply quantum operations, e.g., quantum gates, in accordance with a quantum algorithm (e.g., Grover's algorithm), on the one or more patient diagnosis qubits and the qubits encoded with information in diagnosis risk 116 to determine whether the state of one or more of the qubits encoded with the information in diagnosis risk 116 match (or closely matches) the state of the patient diagnosis qubits.

The output of the quantum operations may include diagnosis data (e.g., diagnosis likelihood for each condition) for the patient. Quantum computing device 220 may encode the diagnosis data for the patient and the treatment-relevant information 108B of the patient as one or more patient treatment qubits (306).

The treatment recommendation system 100 implements a second quantum search algorithm using the one or more patient treatment qubits to search within a second database (e.g., medication risk/efficacy 118) for one or more entries corresponding to the diagnosis data for the patient and the treatment-relevant information of the patient, wherein the one or more entries corresponding to the diagnosis data for the patient and the treatment-relevant information of the patient indicates one or more treatment recommendations for the patient (308). For example, the treatment recommendation system 100 may generate a recommendation score for each of the one or more treatment recommendations. To compute a recommendation score for a particular drug in treating a specific condition, treatment recommendation system 100 may compute a recommendation score based on a health risk associated with using the particular drug for a specific condition, efficacy of the particular drug in treating the specific condition, health risk associated with using the particular drug incorrectly, likelihood of the patient having the specific condition, likelihood of the patient using the particular drug incorrectly (e.g., based on history of medication non-adherence of misuse). Quantum circuit 222 of quantum computing device 220 may apply quantum operations, e.g., quantum gates, in accordance with a quantum algorithm (e.g., Grover's algorithm), on the one or more patient treatment qubits and qubits encoded with the one or more treatment recommendations in medication risk/efficacy 118 to determine whether the state of one or more the qubits encoded with the one or more treatment recommendations match (or closely match) the state of the patient treatment qubits.

In some examples, treatment recommendation system 100 outputs the one or more treatment recommendations to a classical computing device. For example, quantum computing device 220 may send the one or more treatment recommendations to computing device 202 of treatment recommendation system 100, which may output, e.g., for display on a display of computing device 202, the one or more treatment recommendations.

One or more of the techniques described in this disclosure may be implemented, at least in part, in hardware, software, firmware or any combination thereof. For example, various aspects of the described techniques may be implemented within one or more processors or processing circuitry, including one or more microprocessors, digital signal processors (DSPs), application specific integrated circuits (ASICs), field programmable gate arrays (FPGAs), graphics processing units (GPUs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, circuits or components may be implemented together or separately as discrete but interoperable logic devices. Depiction of different features as circuits or units is intended to highlight different functional aspects and does not necessarily imply that such circuits or units must be realized by separate hardware or software components. Rather, functionality associated with one or more circuits or units may be performed by separate hardware or software components or integrated within common or separate hardware or software components.

One or more of the techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A quantum computing device comprising:
a first quantum encoder configured to encode diagnosis-relevant information associated with a patient as one or more patient diagnosis qubits;
a first quantum circuit configured as a first quantum search algorithm to:
receive as input the one or more patient diagnosis qubits and a plurality of diagnosis probability qubits each encoded with a respective diagnosis probability for a corresponding condition of a plurality of conditions, and
output at least a first diagnosis probability qubit of the plurality of diagnosis probability qubits that matches a state of one of the one or more patient diagnosis qubits, the first diagnosis probability qubit encoding a diagnosis probability associated with a first condition from among the plurality of conditions;
a second quantum encoder configured to encode diagnosis data and treatment-relevant information as one or more patient treatment qubits, wherein the diagnosis data comprises at least the diagnosis probability and the first condition; and
a second quantum circuit configured as a second quantum search algorithm to:
receive as input the one or more patient treatment qubits and a plurality of risk or efficacy qubits each encoded with at least one of a respective risk or respective efficacy of a corresponding treatment of a plurality of treatments, and
output a first risk or efficacy qubit of the plurality of risk or efficacy qubits that matches a state of one of the one or more patient treatment qubits, the first risk or efficacy qubit being encoded with at least one of a risk or efficacy of a particular treatment of the plurality of treatments for treating the first condition, wherein the quantum computing device is configured to decode the first risk or efficacy qubit into classical data specifying the particular treatment and output the classical data to a classical computing device configured to output the classical data for display on the classical computing device.

2. The quantum computing device of claim 1, wherein the diagnosis-relevant information associated with the patient comprises at least one of one or more characteristics of the patient, one or more symptoms of the patient, or a medical history of the patient.

3. The quantum computing device of claim 1, wherein the treatment-relevant information comprises one or more of medication adherence information of the patient or medication efficacy information of the patient.

4. The quantum computing device of claim 1, wherein the diagnosis probability for each condition of the plurality of conditions is computed based on the diagnosis-relevant information associated with the patient.

5. The quantum computing device of claim 1, wherein the first quantum search algorithm and the second quantum search algorithm are based at least in part on Grover's algorithm.

6. The quantum computing device of claim 1, wherein the particular treatment is associated with a recommendation score computed based on at least one of a risk of a particular drug in treating a particular condition of the plurality of conditions, an efficacy of the particular drug in treating the particular condition, a risk associated with using the particular drug incorrectly, a likelihood of the patient having the particular condition, or a likelihood of the patient using the particular drug incorrectly.

7. A computer-implemented method comprising:
encoding, by a quantum computing device, diagnosis-relevant information associated with a patient as one or more patient diagnosis qubits;
receiving, by a first quantum circuit configured as a first quantum search algorithm of the quantum computing device, as input the one or more patient diagnosis qubits and a plurality of diagnosis probability qubits each encoded with a respective diagnosis probability for a corresponding condition of a plurality of conditions, and
outputting, by the first quantum circuit, at least a first diagnosis probability qubit of the plurality of diagnosis probability qubits that matches a state of one of the one or more patient diagnosis qubits, the first diagnosis probability qubit encoding a diagnosis probability associated with a first condition from among the plurality of conditions;
encoding, by the quantum computing device, diagnosis data and treatment-relevant information as one or more patient treatment qubits, wherein the diagnosis data comprises at least the diagnosis probability and the first condition;
receiving, by a second quantum circuit configured as a second quantum search algorithm of the quantum computing device, as input the one or more patient treatment qubits and a plurality of risk or efficacy qubits each encoded with at least one of respective risk or respective efficacy of a corresponding treatment of a plurality of treatments,
outputting, by the second quantum circuit, a first risk or efficacy qubit of the plurality of risk or efficacy qubits that matches a state of one of the one or more patient treatment qubits, the first risk or efficacy qubit being encoded with at least one of a risk or efficacy of a particular treatment of the plurality of treatments for treating the first condition;
decoding, by the quantum computing device, the first risk or efficacy qubit into classical data specifying the particular treatment; and
outputting, by the quantum computing device, the classical data to a classical computing device configured to output the classical data for display on the classical computing device.

8. The computer-implemented method of claim 7, wherein the diagnosis-relevant information associated with the patient comprises at least one of one or more characteristics of the patient, one or more symptoms of the patient, or medical history of the patient.

9. The computer-implemented method of claim 7, wherein the treatment-relevant information comprises one or more of medication adherence information of the patient or medication efficacy information of the patient.

10. The computer-implemented method of claim 7, wherein the diagnosis probability for each condition of the plurality of conditions is computed based on the diagnosis-relevant information associated with the patient.

11. The computer-implemented method of claim 7, wherein the first quantum search algorithm is based at least in part on Grover's algorithm.

12. The computer-implemented method of claim 7, further comprising:
computing, by the quantum computing device, a recommendation score for the particular treatment, wherein the recommendation score is computed based on at least one of a risk of a particular drug in treating a particular condition of the plurality of conditions, an efficacy of the particular drug in treating the particular condition, a risk associated with using the particular drug incorrectly, a likelihood of the patient having the particular condition, or a likelihood of the patient using the particular drug incorrectly.

13. One or more non-transitory computer-readable storage media encoded with processor-executable instructions that, when executed by one or more processors, cause the one or more processors to:
encode diagnosis-relevant information associated with a patient as one or more patient diagnosis qubits;
receive as input one or more patient diagnosis qubits and a plurality of diagnosis probability qubits each encoded with a respective diagnosis probability for a corresponding condition of a plurality of conditions;
output at least a first diagnosis probability qubit of the plurality of diagnosis probability qubits that matches a state of one of the one or more patient diagnosis qubits, the first diagnosis probability qubit encoding a diagnosis probability associated with a first condition from among the plurality of conditions;
encode diagnosis data and treatment-relevant information as one or more patient treatment qubits, wherein the diagnosis data comprises at least the diagnosis probability and the first condition;
receive as input the one or more patient treatment qubits and a plurality of risk or efficacy qubits each encoded with at least one of respective risk or a respective efficacy of a corresponding treatment of a plurality of treatments, and
output a first risk or efficacy qubit of the plurality of risk or efficacy qubits that matches a state of one of the one or more patient treatment qubits, the first risk or efficacy qubit being encoded with at least one of a risk or efficacy of a particular treatment of the plurality of treatments for treating the first condition;

decode the first risk or efficacy qubit into classical data specifying the particular treatment; and output the classical data to a classical computing device configured to output the classical data for display on the classical computing device.

14. The one or more non-transitory computer-readable storage media of claim 13, wherein the diagnosis-relevant information associated with the patient comprises at least one of one or more characteristics of the patient, one or more symptoms of the patient, or medical history of the patient.

15. The one or more non-transitory computer-readable storage media of claim 13, wherein the treatment-relevant information comprises one or more of medication adherence information of the patient or medication efficacy information of the patient.

* * * * *